2 Sheets—Sheet 1.

G. KIMBALL.
Wheel-Plow.

No. 212,234. Patented Feb. 11, 1879.

Witnesses:
J. W. Garner
W. S. D. Haines

Inventor:
G. Kimball,
per
J. A. Lehmann,
atty.

G. KIMBALL.
Wheel-Plow.

No. 212,234.   Patented Feb. 11, 1879.

UNITED STATES PATENT OFFICE.

GEORGE KIMBALL, OF LAWRENCE, KANSAS.

IMPROVEMENT IN WHEEL-PLOWS.

Specification forming part of Letters Patent No. 212,234, dated February 11, 1879; application filed December 30, 1878.

*To all whom it may concern:*

Be it known that I, GEORGE KIMBALL, of Lawrence, in the county of Douglas and State of Kansas, have invented certain new and useful Improvements in Wheel-Plows; and I do hereby declare the following to be a full, clear, and exact description of the invention, such as will enable others skilled in the art to which it pertains to make and use it, reference being had to the accompanying drawings, which form part of this specification.

My invention relates to an improvement in wheel-plows; and it consists in the arrangement and combination of parts that will be more fully described hereinafter.

Figure 1:
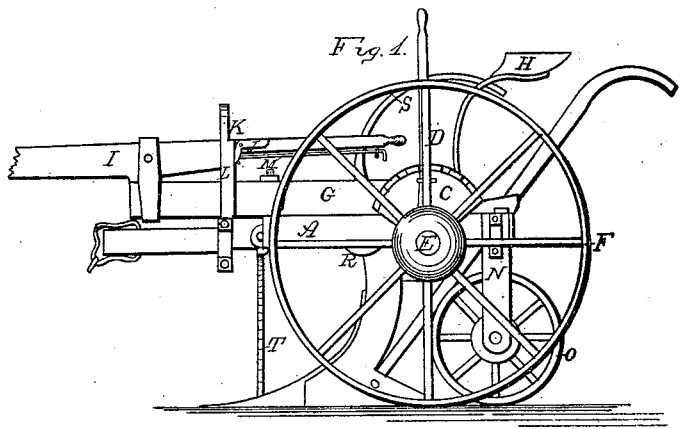
Figure 2:
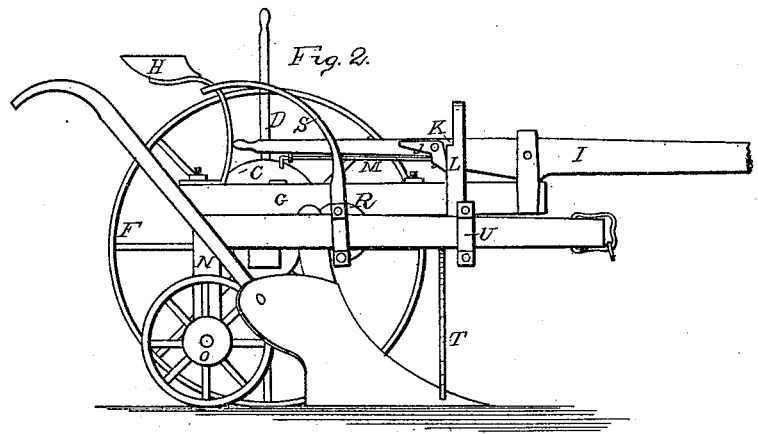
Figure 3:
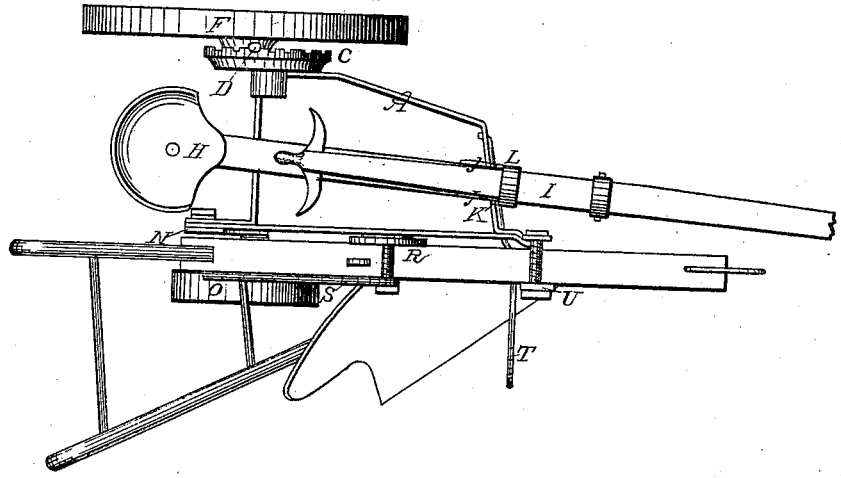
Figure 4:
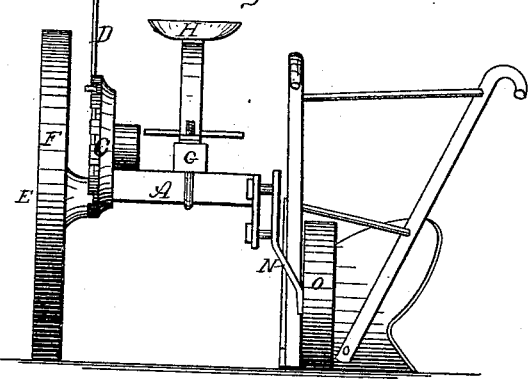

Figure 1 of the drawings represents a side elevation of my invention taken from one side; Fig. 2, a side elevation taken from the opposite side. Fig. 3 is a plan view. Fig. 4 is a rear view.

A represents the frame of the shape shown, and which may be made of one continuous piece, extending around three of its sides, while the fourth side is formed by a separate piece, which is secured to the bent ends of the other part by means of suitable clips.

Upon the left rear corner of the frame is secured the rack C, in which the spring D on the cranked axle E catches for the purpose of holding the driving-wheel F in any desired position. By changing the cranked axle from a vertical to an inclined position the side of the frame may be lowered to any desired extent, so as to accommodate the frame of the plow, which is running on a lower level on the other side.

Secured to the top of the frame is a wooden beam, G, upon the rear end of which is secured the driver's seat H. Pivoted upon the extreme front end of this beam, which is made to extend any suitable distance beyond the front of the frame, is the tongue I. This tongue extends in an unbroken piece from the neck of the animal's back to the driver's hands, and oscillates freely upon its pivot. While the plow is in operation this tongue is left to play freely up and down, so as to accommodate the plow to any inequalities of surface, and to make the draft easier upon the team.

When it is desired to lift the plow above the ground, as when in transporting it from one place to another, the catch or lever J is made to catch on top of the shoulder K, formed on the guide L, and thus the front end of the plow will be raised upward above the ground. The catch has connected to it a rod, M, which extends back within easy reach of the driver, so that he can release the tongue at any moment, and thus lower the point of the plow to the earth at any instant.

Secured to the rear right-hand corner of the frame, by means of a suitable clip, is the curved standard or axle N, upon the lower end of which is placed the wheel O, which runs directly behind the plow in the furrow, but is entirely independent thereof. Although this wheel here appears as though supporting the rear part of the plow, yet it is entirely independent and disconnected therefrom, and forms the second driving-wheel of the frame, so that were the plow removed from the machine the frame would be as perfect as with it.

The plow, which may be of any suitable construction, is rigidly clasped by means of two bolts to the side of the swiveled or pivoted plate R, which plate has a slight movement, so as to enable the driver by means of the lever S, secured to the side of the plow, to instantly lower its point into the earth at any desired place. This lever is here shown as connected to the plow at its pivotal point, but it may be secured at any other point preferred.

Secured to the plow-beam, just opposite the extension of the frame at its right-hand front corner, is a clasp or clip, U, of any kind, into which the point of the frame passes. As this clasp or clip is so formed as to allow this extension of the frame to play slightly up and down, it is evident that the plow can be raised and lowered at its point, so that the driver can lower the point at any time desired.

By removing the two bolts which secure the plow-beam to the pivot-plate, the plow here shown can be removed from the frame for the purpose of having another suitable instrument attached to it in place of the plow, or for the purpose of using the frame for any other purpose. By thus making the second driving-wheel of a very small size, and having it run in the furrow in the rear of the plow, the plow can be attached to the side of the machine, where it is much more readily under the control of the driver, and enables the common breaking-plow, of any suitable description, to be attached to the frame whenever desired; also, by attaching the plow to the side of the frame its point can be depressed much more quickly, when it is desired to do so, and thus make it take the ground in less time than where the plow is connected to the axle in the usual manner.

Secured to the front end of the frame, and extending out over the point of the plow, is the curved rod T, which serves to turn under the weeds and stubble.

Having thus described my invention, I claim—

The frame A, having the plow connected to its outer side so as to run just in front of the small wheel O by means of a pivot-plate, R, the front end of the frame being made to catch in the clasp or clip U, secured to the plow so as to limit the distance which the plow shall turn, substantially as described.

In testimony that I claim the foregoing I have hereunto set my hand this 16th day of December, 1878.

GEORGE KIMBALL.

Witnesses:
  E. P. TRAVIS,
  H. D. WHITMAN.